(12) United States Patent
Braeunl et al.

(10) Patent No.: US 7,365,831 B2
(45) Date of Patent: Apr. 29, 2008

(54) METHOD AND DEVICE FOR VIDEO-BASED OBSERVATION AND MEASUREMENT OF THE LATERAL ENVIRONMENT OF A VEHICLE

(75) Inventors: Thomas Hans Braeunl, Crawley Perth (AU); Uwe Franke, Uhingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/528,810

(22) PCT Filed: Sep. 19, 2003

(86) PCT No.: PCT/EP03/10456

§ 371 (c)(1),
(2), (4) Date: Jun. 7, 2006

(87) PCT Pub. No.: WO2004/029877

PCT Pub. Date: Apr. 8, 2004

(65) Prior Publication Data

US 2007/0165908 A1    Jul. 19, 2007

(30) Foreign Application Priority Data

Sep. 23, 2002    (DE) ................................ 102 44 148

(51) Int. Cl.
*G01C 3/08* (2006.01)
(52) U.S. Cl. .................................... 356/4.01
(58) Field of Classification Search ................ 356/4.01
See application file for complete search history.

(56) References Cited

U.S. PATENT DOCUMENTS

2004/0105579 A1* 6/2004 Ishii et al. .................. 382/154

FOREIGN PATENT DOCUMENTS

EP    1 094 337 A2    4/2001
EP    1094337 A2 *  4/2001

OTHER PUBLICATIONS

Wheeler et al.: "Consensus surfaces for modeling 3D objects from multiple range images," IEEE International Conference on Computer Vision, 1998, pp. 917-924, New York.
Dalmia et al.: "High-speed extraction of 3D structure of selectable quality using a translating camera," Computer Vision and Image Understanding, 1996, pp. 97-110, vol. 64, No. 1, Academic Press, Inc., US.
Chen et al.: "A survey of construction and manupulation of octrees," Computer Vision Graphics and Image Processing, 1988, pp. 409-431, vol. 43, No. 3, Academic Press, Inc., US.

* cited by examiner

*Primary Examiner*—Thomas H. Tarcza
*Assistant Examiner*—Luke D. Ratcliffe
(74) *Attorney, Agent, or Firm*—Akerman Senterfitt; Stephan A. Pendorf; Yonghong Chen

(57) ABSTRACT

The first commercially-available driver assist systems required a compromise between the resolution of the scanning and the extent of the scanned region, according to application. Conventional video-based systems have a good compromise between resolution and recording range, however do not generally provide direct distance information. According to the new arrangement of the object of the invention, it is possible to achieve a system, which, on installation in a road vehicle, can record complex dynamic scenes, for example the lateral 3D geometry to the road edge from the point of view of the dynamically operating vehicle and use the same to advantage on parking. According to the invention, the monitoring and measuring of the lateral environment of a vehicle is displayed on the one hand by means of a camera with the digital images and on the other hand with a computer unit which serves to provide the images with a time stamp and to buffer the same. The movements of the vehicle are further recorded, in order to select image pairs from the buffered images, based on the above data. A local 3D depth image of the lateral environment of a vehicle can thus be generated by an algorithm for stereo image processing.

20 Claims, 1 Drawing Sheet

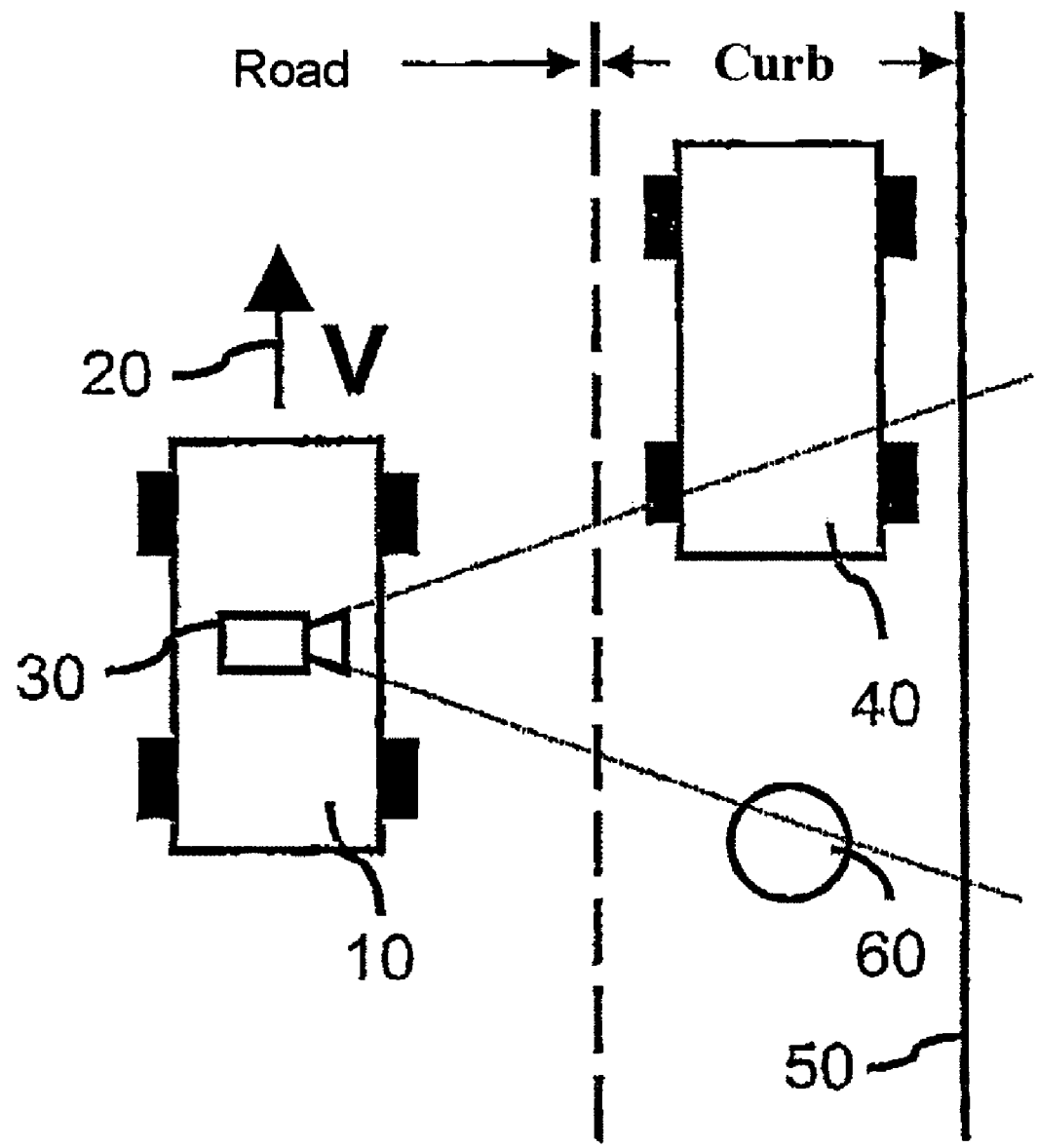
Figure

METHOD AND DEVICE FOR VIDEO-BASED OBSERVATION AND MEASUREMENT OF THE LATERAL ENVIRONMENT OF A VEHICLE

CROSS REFERENCE TO RELATED APPLICATION

This application is a national stage of PCT/EP2003/010456 filed Sep. 19, 2003 and based upon DE 102 44 148.0 filed Sep. 23, 2002 under the International Convention.

BACKGROUND OF THE INVENTION

1. Field of the Invention

The invention relates to a method and a device for video-based observation and measurement of the lateral environment around a road vehicle.

2. Related Art of the Invention

Depending on the application, initial driver assistance systems which are commercially obtainable require a compromise between the resolution of the scanning and the size of the sensed area. For example, the radar sensor system for an ACC application must be restricted to several degrees of the sensing area in the horizontal direction while for a parking assistance function only a short range and resolution can be implemented when sensing the environment next to the vehicle using ultrasonic sound. Conventional video-based systems provide a good compromise between the resolution and the sensing range but generally do not supply any direct distance information.

Systems which use the vehicle's own movement to obtain three-dimensional environment data from two-dimensional depth of profile data are presented, on the one hand, in documents U.S. Pat. No. 4,179,216 A1 and U.S. Pat. No. 4,490,038 A1 for monitoring railway tunnels and fault-free operations on rail routes and, on the other hand, in U.S. Pat. No. 5,278,423 A1 in connection with the selective recovery of pesticides and the sensing of the stock of trees in plantations. In all these systems, a three-dimensional image of the environment is generated in a data processing unit by arranging a set of successive distance profiles in a series. In order to be able to determine the distances between the individual, sequentially recorded profiles, in each case distance sensors are arranged on the wheels of the vehicles fitted with the systems.

A device for sensing the position of an agricultural vehicle which is fitted with a scanning sensor is described in U.S. Pat. No. 5,809,440 A1. Here, the track of the vehicle is followed by means of a global navigation system (GPS). However, since the scanning optical sensor which is used for recording images of the plant cover does not supply any distance information, only a two-dimensional cartography of the underlying surface can be obtained by arranging the sensor information items serially.

Driver's assistance systems are increasingly employing stereoscopic camera systems by means of which it is possible to determine computationally the object width on the basis of the known geometric arrangement of the pair of cameras used. In stereoscopic image processing, an object is scanned from different directions using a pair of cameras. The distance between the stereoscopic camera system and the object is then determined taking into account the camera positions and orientations as well as the camera parameters based on the principle of triangulation.

DE 199 26 559 A1 discloses a method and a device for detecting objects in the environment of a road vehicle. In the method which is presented, the distance from a moving vehicle is calculated by evaluating stereoscopic image pairs and properties of the detected object are determined. In particular, a distance-based segmentation of images is carried out by means of stereoscopic image processing. An object detection process is then carried out in the segment image areas.

A similar system is known from EP 108 72 57 A2, which describes an arrangement for mounting a stereoscopic camera system in a vehicle, which system is used for calculating a three-dimensional distance distribution for an object under consideration. However, when used in road vehicles such stereoscopic image processing systems which are known from the prior art can be used only to a limited degree since the position and orientation of the camera has to be very precise and has to be adjusted with a large amount of effort. Furthermore, such an arrangement is not often robust enough for everyday use and a wide variety of road conditions.

SUMMARY OF THE INVENTION

The invention is based on the object of providing a novel method for video-based observation and measurement of the lateral environment of a vehicle and a vehicle having a sensor system for carrying out the method as claimed in the preambles of patent claims 1 and 15, which method has a high level of mechanical robustness and can be adjusted without a high degree of complexity.

The object is achieved according to the invention by means of a method and a device having the features of patent claims 1 and 15. Advantageous refinements and developments of the invention are disclosed in the subclaims.

According to the invention, the observation and measurement of the lateral environment of a vehicle, mainly in order to detect parking spaces, are carried out, on the one hand, by means of a camera with which digital images are recorded and, on the other hand, by means of a data processing unit which is used to provide the digital images with a time stamp and buffer them.

In a particularly advantageous fashion, the device also comprises a unit for sensing the vehicle's own movement in order to select image pairs from the buffered images on the basis of this data. A further means is provided for determining the position and orientation of the camera which are present at the two recording times. By means of an algorithm for stereoscopic image processing it is thus possible to generate a local 3D depth image on the basis of the image pairing, with the position and orientation of the camera at the recording times being taken into account within the scope of a synthetic stereoscopic geometry.

The novel configuration of the subject matter of the invention makes it possible, for the first time, to provide a system which, when installed in a road vehicle, allows dynamic scenarios such as, for example, the lateral 3D geometry with respect to the edge of the roadway, to be sensed from the point of view of the vehicle which is acting in an actively dynamic fashion and as an advantage of which can evaluate during parking. In contrast to a paired camera arrangement such as is used in conventional stereoscopic camera systems, the monocular camera system according to the invention provides, in conjunction with the method according to the invention, the advantage of requiring significantly less space. Such a system constitutes an advantageous solution for integration in the vehicle with respect to design aspects and additionally provides the advantage of comparatively low costs by dispensing with a second camera. The mechanical robustness is comparatively greater with monocular camera systems than with stereoscopic cameras. A further advantage which is provided by individual camera systems is a significantly reduced degree of complexity with respect to mounting and adjustment.

In one beneficial embodiment of the invention it is conceivable to determine the vehicle's own movement and thus the distance covered on the basis of the sensed number of rotations of the wheel in order to select images to form image pairs for the stereoscopic image processing. Further possible ways of sensing the movement of a road vehicle are also provided by systems for mobile vehicle navigation which mainly operate with GPS (Global Positioning System) and thus provide information about the precise position. Vehicle movement dynamics systems are also being increasingly used in road vehicles which provide a large amount of data on a vehicle's own movement while taking into account engine data and information relating to the steering system and brakes.

In a particularly beneficial fashion it is conceivable, in particular at low speeds, that the images to be selected to form image pairs do not necessarily need to be two directly successive image recordings. For two image recordings to form one image pair, the time stamp should ideally be selected in such a way that the time difference, after conversion in order to take into account the vehicle's own speed, corresponds to a permanently predefined distance (stereoscopic basis). However, the distance (stereoscopic basis) should preferably be selected such that depending on the current speed at the time of two image recordings it lies in a range between 0.2 m and 1 m. Since the average speed of a vehicle when a road vehicle is parked is approximately 12 Km/h, the distance which is covered (stereoscopic basis) of 0.13 m between the two image recordings is ideal.

In a further advantageous refinement of the invention it is conceivable that only buffered image pairs during whose recording the camera orientation has not changed significantly can be used for further processing. A change in the orientation of the camera can be brought about by a change in position of the vehicle, owing, for example, to greatly changing road conditions. A change in the orientation of the camera between two recording times leads to a falsification of the result during the further processing, similar to a maladjustment of a stereoscopic camera system within the scope of the processing of stereoscopic images.

The subject matter of the invention can be used in a particularly advantageous way with the objective of obtaining a global 3D depth view from the sequence of accumulated local 3D depth views acquired by means of the image pairs. In this context, the image data of the individual local 3D depth views which can be assigned to the same location points in the environment of the vehicle are added to one another and are stored in a geometric data structure. The geometric data structure is expanded continuously here in the same direction with the newly added image areas in accordance with the direction of travel of the vehicle.

In a further advantageous refinement of the invention, the image data of the respective local location points which is to be added for a global 3D depth view is subjected to weighting before the accumulation process. Owing to this weighting, the noise which has been produced during the accumulation process can be reduced by subsequently filtering individual pixels.

In one particularly beneficial way, in order to filter individual pixels the volume which is represented within the scope of the weighting by means of the accumulated 3D depth views is divided into individual volume elements and the pixels to be added are distributed among the volume elements. All the volume elements preferably comprise a predefined uniform volume, for example in the form of cubes.

It is advantageous to store the individual volume elements in a hierarchical data structure, in particular in a tree structure. The tree structure is beneficially an octree. In which case, with an octree, each node distributes the set of stored volumes among eight subtrees (volume elements) by means of a 3D key. Each subtree can in turn be subdivided further.

The number of pixels within the individual volume elements can be beneficially assigned to the volume elements as a respective weighting. For this reason, in addition to the data of the pixels the weighting of the volume elements is stored in the tree structure.

It is particularly advantageous to acquire the average weighting of all the volume elements and thus determine an overall weighting. A threshold value on whose basis it is decided whether the pixels contained in the individual volume elements are taken into account in the further processing is formed. In this context, only those pixels whose assigned volume element has a weighting which is equal to or greater than the threshold value is taken into account. Only those volume elements which contain pixels are advantageously used to determine the overall weighting.

The subject matter of the invention can be used particularly advantageously with the objective of forming the threshold value by multiplying the overall weighting with a tuning factor. During the examination of a parking sequence with a volume of 8×3×5 $m^3$ and a subdivision into 8 cells an average weighting of 7.7 for the cells was obtained. With a tuning factor of 1.5 the number of pixels per image was thus able to be reduced from 46013 to 29792.

The camera used within the scope of the invention may be a camera which is a component of some other image recording system which is already present in the vehicle.

The invention will be explained in detail below with reference to an exemplary embodiment and a figure.

The figure shows, for example, a traffic scenario using the device according to the invention for video-based observation and measurement of the lateral environment around a road vehicle (10). The measurement of the lateral 3D geometry of a traveling vehicle with respect to the edge of the roadway is used here to measure a parking space. A parking vehicle (40), a crash barrier (50) or some other object (60) which are significantly elevated from the surface of the roadway, and thus cannot be driven over, may be located at the edge of the roadway.

For this purpose, a monocular camera (30) in conjunction with a computer unit is installed in the road vehicle (10). The camera (30) is configured in such a way that the angle between the optical axis and the direction (20) of travel is preferably 90°. However, the possible orientation of the camera (30) is not restricted to the orientation which is perpendicular to the direction (20) of travel but rather may have an orientation of an angle of 45° to 135° with respect to the direction (20) of travel for areas which are to be sensed. The variation in the orientation of the camera may be used advantageously in particular for different configuration possibilities with respect to the integration into the vehicle as a whole. The image sequence which is obtained from the movement of the vehicle (10) when recording using the camera (30) is provided with the time stamps by means of the computer unit and buffered. An algorithm for stereoscopic image processing is used to generate from the buffered images a 3D image of the parking space taking into account the vehicle's (10) own movement. On the basis of the 3D information it is possible to decide, taking into account a defined parking strategy, whether the sensed 3D space is suitable for parking the vehicle, and whether in particular sufficient space for parking is available.

For a person skilled in the art it is self-explanatory that the subject matter of the invention is also suitable for other uses in road traffic. For example, the invention is also suitable for providing benefits when used as a warning system which measures the lateral distance between a vehicle and the edge of the roadway and warns the driver when a minimum distance is undershot, in a way which is analogous with the exemplary embodiment specified above.

The invention claimed is:

1. A method for observing and measuring the lateral environment of a vehicle,
    wherein a sequence of digital images are recorded by means of a camera, provided with a time stamp and buffered,
    wherein the vehicle's own movement is sensed in order to select chronologically overlapping stereoscopic image pairs from the buffered images on the basis of this data,
    wherein the position and orientation of the camera which are present at the two recording times are determined,
    wherein a local 3D depth image is generated on the basis of the image pairing by means of an algorithm for stereoscopic image processing,
    wherein the position and orientation of the camera at the recording times are taken into account within the scope of a synthetic stereoscopic geometry, and
    only buffered images during whose recording the orientation of the camera has not changed significantly are selected to form image pairs.

2. The method as claimed in claim 1, wherein the vehicle's own movement is sensed on the basis of the speed, the number of revolutions of the wheel, navigation information or data from vehicle movement dynamics systems.

3. The method as claimed in claim 1, wherein buffered images are selected to farm image pairs in such a way that the distance covered between the recording times of the images corresponds to a predefined value.

4. The method as claimed in claim 3, wherein the predefined value is preferably in the range between 0.2 m and 1 m.

5. The method as claimed in claim 1, wherein a sequence of local 3D depth views are accumulated, wherein the image data of the individual local 3D depth views which can be assigned to the same location points in the environment of the vehicle are added to one another.

6. The method as claimed in claim 5, wherein the image data is subjected to weighting before the addition.

7. The method as claimed in claim 6, wherein the volume which is represented by means of the accumulated 3D depth views is divided into individual volume elements within the scope of the weighting.

8. The method as claimed in claim 7, wherein all the volume elements correspond to a predefined uniform volume.

9. The method as claimed in claim 7, wherein the volume elements are stored in a tree structure, in particular in the form of an octree.

10. The method as claimed in claim 7, wherein the respective number of pixels within the individual volume elements is assigned to each of these volume elements as a weighting.

11. The method as claimed in claim 10, wherein a weighting is determined which corresponds to the average weighting of all the volume elements, this overall weighting forming a threshold value on the basis of which it is decided whether the pixels which are contained in the individual volume elements are taken into account in the further processing, wherein only those pixels at which the volume element assigned to them has a weighting which is equal to or greater than the threshold value are taken into account.

12. The method as claimed in claim 11, wherein only those volume elements which contain pixels are used to form the overall weighting.

13. The method as claimed in claim 11, wherein the threshold value is formed by multiplying the overall weighting by a tuning factor.

14. A device for 3D observation and measurement of the lateral environment of a vehicle, comprising a camera for recording a sequence of digital images which is connected to a data processing unit by means of which the images are provided with a time stamp and buffered,
    wherein a unit for sensing the vehicle's own movement is provided,
    wherein a means for selecting image data on the basis of the vehicle's own movement in order to form chronologically overlapping stereoscopic image pairs is provided, and which is connected to a unit for stereoscopic image processing, and
    only buffered images during whose recording the orientation of the camera has not changed significantly are selected to form image pairs.

15. The device as claimed in claim 14, wherein the unit for sensing the vehicle's own movement is a speedometer, wheel speed meter, navigation system or a vehicle movement dynamics system.

16. The device as claimed in claim 14, wherein the camera has a 90° orientation with respect to the direction of travel.

17. The device as claimed in claim 14, wherein the camera has an orientation of 45°-135° with respect to the direction of travel.

18. The device as claimed in claim 14. wherein the camera is a component of an image recording system which is already located in the vehicle.

19. The method as claimed in claim 4, wherein the predefined value is 0.3 m.

20. A method for observing and measuring the lateral environment of a vehicle,
    wherein a sequence of digital images are recorded by means of a camera, provided with a time stamp and buffered,
    wherein the vehicle's own movement is sensed in order to select chronologically overlapping stereoscopic image pairs from the buffered images on the basis of this data,
    wherein the position and orientation of the camera which are present at the two recording times are determined,
    wherein a local 3D depth image is generated on the basis of the image pairing by means of an algorithm for stereoscopic image processing,
    wherein the position and orientation of the camera at the recording times are taken into account within the scope of a synthetic stereoscopic geometry,
    wherein a sequence of local 3D depth views are accumulated, wherein the image data of the individual local 3D depth views which can be assigned to the same location points in the environment of the vehicle are added to one another, wherein the image data is subjected to weighting before the addition, wherein the volume which is represented by means of the accumulated 3D depth views is divided into individual volume elements within the scope of the weighting, and wherein the respective number of pixels within the individual volume elements is assigned to each of these volume elements as a weighting.

* * * * *